(12) United States Patent
Robinson et al.

(10) Patent No.: US 10,836,225 B2
(45) Date of Patent: Nov. 17, 2020

(54) DETACHABLE RECEIVER

(71) Applicant: HORIZON GLOBAL AMERICAS INC., Plymouth, MI (US)

(72) Inventors: Thomas Edward Robinson, Warren, MI (US); Henry J. Guthard, Livonia, MI (US); Jordan Mazurek, Plymouth, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 13 days.

(21) Appl. No.: 15/691,140

(22) Filed: Aug. 30, 2017

(65) Prior Publication Data

US 2018/0056739 A1 Mar. 1, 2018

Related U.S. Application Data

(60) Provisional application No. 62/381,401, filed on Aug. 30, 2016.

(51) Int. Cl.
*B60D 1/52* (2006.01)
*B60D 1/07* (2006.01)
(Continued)

(52) U.S. Cl.
CPC .............. *B60D 1/52* (2013.01); *B60D 1/075* (2013.01); *B60D 1/167* (2013.01); *B60D 1/28* (2013.01)

(58) Field of Classification Search
CPC .......... B60D 1/52; B60D 1/075; B60D 1/167; B60D 1/28; B60D 1/54; B60D 1/56
See application file for complete search history.

(56) References Cited

U.S. PATENT DOCUMENTS 2,978,260 A * 4/1961 Hebeisen ................. B60D 1/52
280/491.5
3,768,837 A 10/1973 Reese
(Continued)

FOREIGN PATENT DOCUMENTS

DE 202012101729 5/2012
DE 102011009306 7/2012
(Continued)

OTHER PUBLICATIONS

Innternational Searching Authority, European Patent Office, International Search Report and Written Opinion for International App. No. PCT/US2017/049391 dated Nov. 28, 2017.
(Continued)

*Primary Examiner* — Jacob D Knutson
*Assistant Examiner* — Michael R Stabley
(74) *Attorney, Agent, or Firm* — McDonald Hopkins LLC

(57) ABSTRACT

Disclosed is a detachable receiver apparatus for a hitch assembly. The apparatus includes a body having an attachment portion and a receiver portion. The attachment portion may be selectively attached to a frame of a towing vehicle. The receiver portion may be selectively attached to a receiver member. The receiver member may selectively attach to a hitch bar. In one embodiment, the receiver portion is received within the receiver member. In another embodiment, the receiver portion defines a cavity for receiving the receiver member. The attachment portion may include at least one locking member for selectively locking or unlocking the attachment portion to the frame of the towing vehicle. The assembly may include an actuator for selectively locking and unlocking the locking member.

21 Claims, 4 Drawing Sheets

(51) Int. Cl.
*B60D 1/167* (2006.01)
*B60D 1/28* (2006.01)

(56) References Cited

U.S. PATENT DOCUMENTS

| | | | | |
|---|---|---|---|---|
| 4,266,799 | A * | 5/1981 | Wood | B60D 1/06 280/482 |
| 4,280,713 | A * | 7/1981 | Bruhn | B62D 53/08 280/416.1 |
| 4,555,125 | A * | 11/1985 | Goodlove | B60D 1/02 280/515 |
| 5,184,840 | A | 2/1993 | Edwards | |
| 5,277,448 | A * | 1/1994 | Colibert | B60D 1/485 280/491.5 |
| 5,620,198 | A | 4/1997 | Borchers | |
| 5,908,201 | A | 6/1999 | Van Vleet | |
| 6,089,431 | A | 7/2000 | Heyworth | |
| 6,145,866 | A * | 11/2000 | Peter | B60D 1/02 280/515 |
| 6,626,450 | B2 * | 9/2003 | Braun | B60D 1/485 280/500 |
| 7,819,416 | B2 * | 10/2010 | Moss | B60D 1/06 280/491.1 |
| 8,328,224 | B1 * | 12/2012 | Alsaid | B60D 1/52 280/491.2 |
| 8,720,932 | B2 * | 5/2014 | Kim | B60D 1/06 280/491.1 |
| 2002/0084622 | A1 | 7/2002 | Hansen | |
| 2002/0140206 | A1 | 10/2002 | Lloyd | |
| 2003/0015856 | A1 | 1/2003 | Hancock | |
| 2004/0021295 | A1 | 2/2004 | Westerdale | |
| 2004/0222614 | A1 | 11/2004 | Lindenman | |
| 2005/0236808 | A1 | 10/2005 | Lier | |
| 2006/0225264 | A1 | 10/2006 | Mahidhara | |
| 2007/0290483 | A1 * | 12/2007 | Visser | B60D 1/52 280/507 |
| 2009/0189368 | A1 | 7/2009 | Smith et al. | |
| 2010/0109286 | A1 * | 5/2010 | Visser | B60D 1/52 280/477 |
| 2013/0038040 | A1 | 2/2013 | Di Parma | |
| 2014/0103618 | A1 * | 4/2014 | de Kock | B60D 1/52 280/491.3 |
| 2015/0083770 | A1 | 3/2015 | Ziola | |

FOREIGN PATENT DOCUMENTS

| | | |
|---|---|---|
| DE | 202013009204 | 1/2015 |
| EP | 2913208 | 9/2015 |
| WO | WO2004/026598 | 4/2004 |
| WO | WO2016202956 | 12/2016 |

OTHER PUBLICATIONS

International Searching Authority, European Patent Office, International Search Report and Written Opinion for International App. No. PCT/US2018/058182 dated Feb. 11, 2019.

International Search Report dated Sep. 19, 2016; International Application No. PCT/EP2016/063956 filed Jun. 16, 2016; ISA/EP.

* cited by examiner

DETACHABLE RECEIVER

RELATED INVENTIONS

This application claims priority to, and incorporates by reference herein, U.S. Provisional Patent Application No. 62/381,401 filed on Aug. 30, 2016.

FIELD OF INVENTION

The present disclosure relates generally to the field of vehicle hitches and more particularly to a detachable receiver apparatus for a hitch assembly.

BACKGROUND

Hitch assemblies for vehicles such as trucks generally include a hitch bar that is removably insertable into a hitch receiver rigidly attached to a vehicle. The hitch receiver generally includes a length of rectangular steel tube stock longitudinally oriented and connected to the frame under the rear of the vehicle. The hitch assembly generally includes a hitch bar that carries a hitch ball or clevis and which fits into the end of the receiver. The hitch bar is then releasably locked in place with a pin that is inserted through complimentary holes in the receiver tube and the hitch bar. Examples of various hitch receivers are disclosed in, for example, U.S. Pat. No. 3,768,837 to Reese, and U.S. Pat. No. 5,620,198 to Borchers which are hereby incorporated by reference in their entirety.

Tow systems rely on interfacing with the vehicle frame using existing mounting locations. Hitch tubes may be attached to cross tubing and frame brackets to support the hitch receiver along a center portion thereon. However, these structural configurations may impede clearance with the exhaust system and the ground. In many cases, the hitch tube may also protrude past the fascia or bumper of the vehicle, potentially impeding the proper function of these components. One possible solution, cutting or modifying the fascia or bumper of the vehicle to allow the receiver tube clearance to accept a hitch bar with ball mount or clevis, requires significant modification to the vehicle itself.

Another problem is that hitch tubes are rigidly attached to the vehicle frame and, therefore, remain visible during operation of a vehicle even when the towing system is not in use. Some vehicles may have inadequate clearances due to the location of a muffler or otherwise to various structural, thermal, or other dynamic vehicle structures positioned along a rear portion of a vehicle or vehicle frame. Additionally, hitch receivers, frames and other portions of tow systems may rust or corrode over time, degrading both the function and the aesthetics of the assembly itself.

Therefore, it would be desirable to have a detachable receiver to provide improvements to the identified issues.

SUMMARY

In one embodiment, disclosed is a detachable receiver apparatus for a hitch assembly. The apparatus includes a body having an attachment portion and a receiver portion. The attachment portion may be selectively attached to a frame of a towing vehicle. The receiver portion may be selectively attached to a receiver member. The receiver member may selectively attach to a hitch bar. In one embodiment, the receiver portion is received within the receiver member. In another embodiment, the receiver portion defines a cavity for receiving the receiver member. The attachment portion may include at least one locking member for selectively locking or unlocking the attachment portion to the frame of the towing vehicle. The assembly may include an actuator for selectively locking and unlocking the locking member.

The invention may include any combination of the following features:
  a hitch receiver tube;
  a body attached to the hitch receiver tube, the body having an attachment portion oriented at a substantially perpendicular angle relative to the hitch receiver tube;
  wherein the attachment portion selectively attaches to a connection point on a vehicle;
  a hitch ball mount selectively attachable to the receiver tube at an end of said receiver tube that is opposite to an end attached to the body;
  wherein the receiver tube has a substantially square shaped opening for selectively attaching the hitch ball mount;
  a receiver coupler selectively attachable to the attachment portion between the body and the connection point;
  wherein the receiver coupler includes a cavity;
  wherein the receiver coupler selectively locks to the attachment portion;
  an actuator integrated with the receiver apparatus cooperating with the lock;
  wherein a shoulder is formed on the receiver coupler;
  wherein an actuator selectively locks attachment portion and the shoulder;
  at least one support fin integrated between the attachment portion and the body;
  wherein the body includes an opening to receive and selectively attach to the receiving member;
  wherein the attachment portion includes a tapering terminal end; and
  a plurality of receiver extension members having varying lengths.

The invention may also include any combination of the following features:
  a body having an upright vehicle attachment end portion and a horizontal receiver attachment end portion, the vehicle and receiver attachment portions forming an L-shape;
  and
  a receiver coupler connecting the attachment portion to a connection point on a vehicle;
  wherein the receiver coupler is a cylindrical body including an opening which receives a portion of the attachment portion;
  wherein the opening faces downward;
  a locking mechanism to secure the attachment portion to the receiver coupler.
  wherein the horizontal receiver attachment end portion includes a polygonal opening sized to couple to a towing accessory;
  wherein the polygonal opening is substantially square-shaped;
  wherein a terminal end point of the attachment end portion has a conical or tapering shape; and
  wherein the terminal end point cooperates with a corresponding shape formed in the receiver coupler.

BRIEF DESCRIPTION OF THE DRAWINGS

Operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1A:
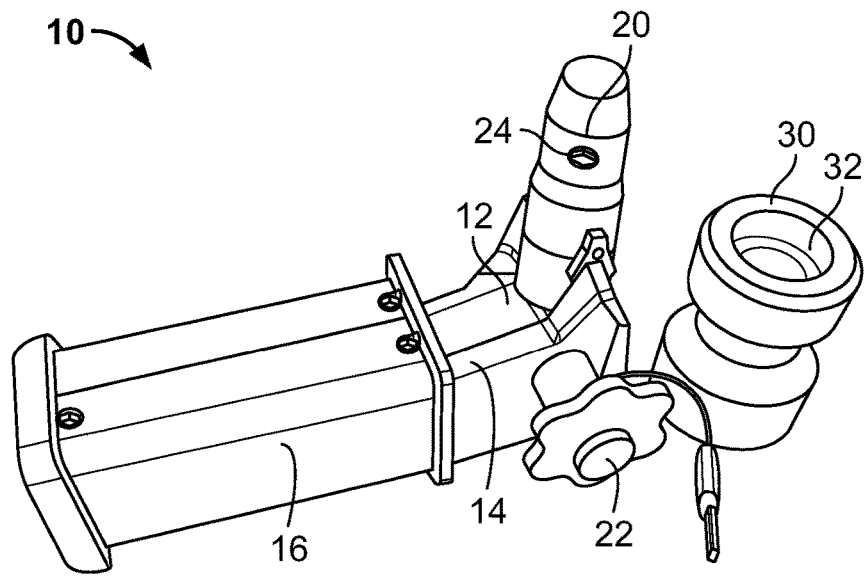
FIG. 1A is a perspective view of embodiments of a hitch receiver assembly with a receiver coupler in accordance with the instant disclosure.
Figure 1B:
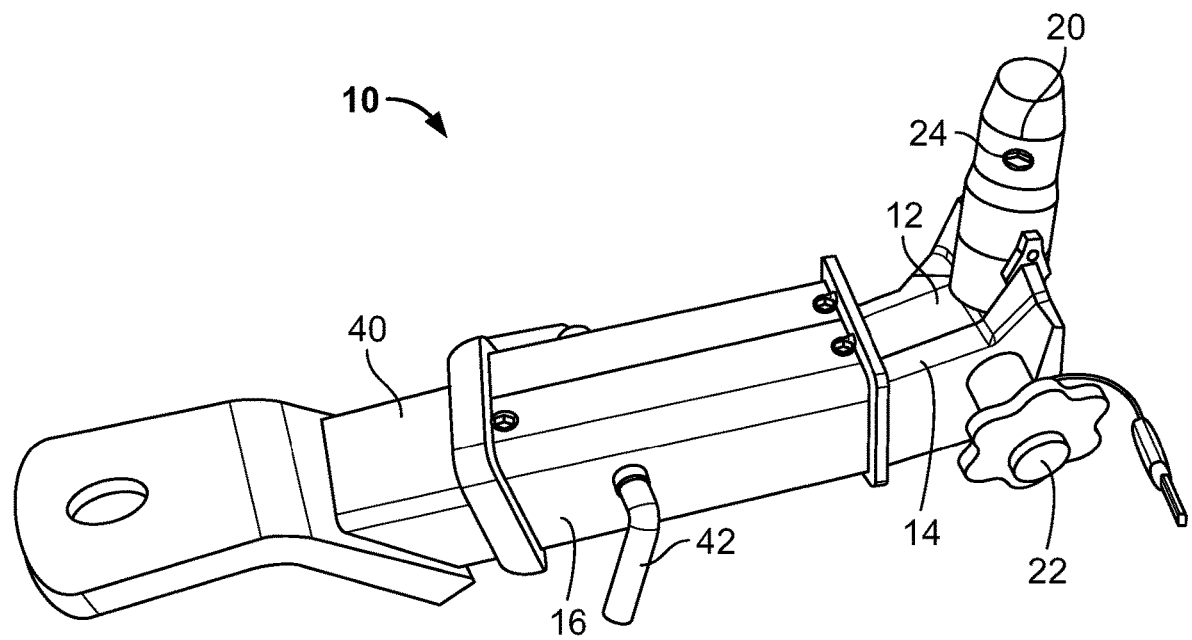
FIG. 1B is a perspective view the hitch receiver assembly of FIG. 1A with a ball mount.

FIGS. 1A and 1B illustrate an embodiment of a hitch receiver assembly 10 in accordance with the instant disclosure. The hitch receiver assembly 10 includes a coupler body 12 having receiving portion 14 and an attachment portion 20. The receiving portion 14 is selectively coupled to a receiving member 16. The attachment portion 20 is selectively coupled to a frame of a towing vehicle (not shown). The coupler body 12 may have a generally L-shaped configuration to allow the attachment portion 20 to be positioned generally perpendicularly related to the receiving portion 14.

The attachment portion 20 may have a tapered configuration to be able to slide into and attach with a receiver coupler 30. The attachment portion 20 may include at least one locking member 24 that may be toggled between a locked position and an unlocked position. One such coupler and attachment portion 20 configuration is disclosed by European Patent 2 353 892 which is incorporated by reference in its entirety. In one embodiment, the at least one locking member 24 may be a ball bearing that at least partially extends from a surface of the attachment portion 20 in the locked position and is recessed or retractable from the surface of the attachment portion 20 in the unlocked position. An actuator 22 may allow a user to toggle the locking member 24 between the locked and unlocked positions. In one embodiment, the actuator 22 may be rotated by a user to actuate the locking member 24.

The receiver coupler 30 may be rigidly mounted to the frame of a towing vehicle (not shown) via a permanent or selectively detachable connection. In one embodiment, the receiver coupler 30 includes a cylindrical shape defining a cavity with an opening at least one end. The attachment portion 20 may be received within the opening of the coupler 30, with the receiver coupler 30 preferably facing downwardly towards the ground. The receiving coupler 30 also includes a shoulder 32 configured to attach to connection point on the vehicle.

In operation, the attachment portion 20, having the locking member 24 in the unlocked position, is positioned within the opening of the receiving coupler 30 until the locking member 24 extends past the shoulder 32. The actuator 22 includes a toggle or other activator (e.g., lever, switch, turn knob, spring loaded pin, etc.) to engage the locking member 24 to the locked position such that the locking member 24 captures at least a portion of the shoulder 32 of the receiving coupler 30 to lock the attachment portion 20 to the receiving coupler 30.

Figure 4:
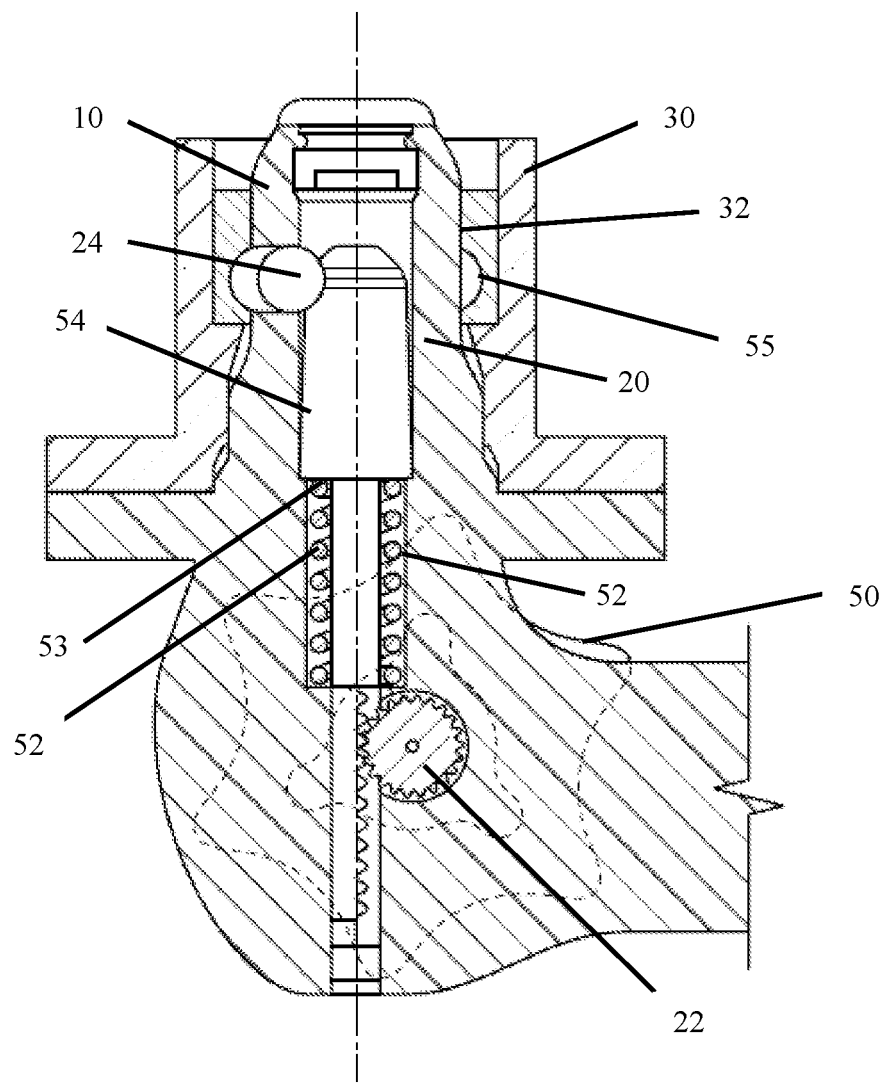
FIG. 4 is a cross sectional view of the locking mechanism of the receiver coupler to the attachment portion according to certain aspects of the instant disclosure.

For example, with reference to FIG. 4, actuator 22 includes a turning dial 50. The dial 50 engages a cylindrical threaded driver 52 attached to a drive actuator 54 at connector 53. Drive actuator 54 moves in an up or down direction, thereby displacing locking member 24, e.g., a movable ball bearing, into or out of locking annular groove 55. Coupler 30 may include annulus 32 to accommodate groove 55, or the groove may integral formed.

In some embodiments, the terminal end of the attachment portion has a circular, curved, conical, and/or tapered appearance to facilitate positioning of the coupler 30. In the same manner, the downward facing opening may have a cooperating slope or taper (possibly even integrated with the shoulder 32) to simplify the engagement process. The shape of a horizontal cross section of the attachment portion 20 may be specially formed to receive the receiver only in a specific orientation (e.g., an oval, a straight-edged portion or portions, a tab or cutout, etc.).

At the base end of the attachment portion 20 opposite to its terminal end (i.e., where portion 20 connects orthogonally to coupler body 12), the rounded and/or curving shape of the portion 20 transitions to blend with and be securely supported by the body 12. In some embodiments, reinforcing fins, supports, or other members may be positioned around portions of the base end.

Further, the receiving portion 14 may be permanently or selectively attached to the receiving member 16. When permanently attached, portion 14 and member 16 are effectively a single cast or forged piece. In one embodiment, the receiving member 16 may be shaped as a female tube end. The receiving portion 14 of the body 12 is inserted within the receiving member 16 as illustrated by FIGS. 1A and 1B. A hitch bar 40 may be selectively inserted into and mated on the opposite side of the receiving member 16. The hitch bar 40 may be a generally conventional configuration that is selectively coupled to a towed vehicle such as a ball mount, clevis, or other coupling arrangement. The hitch bar 40 may be attached to the receiving member 16 with a hitch pin 42 that extends through apertures in the receiving member and hitch bar 40.

Figure 2:
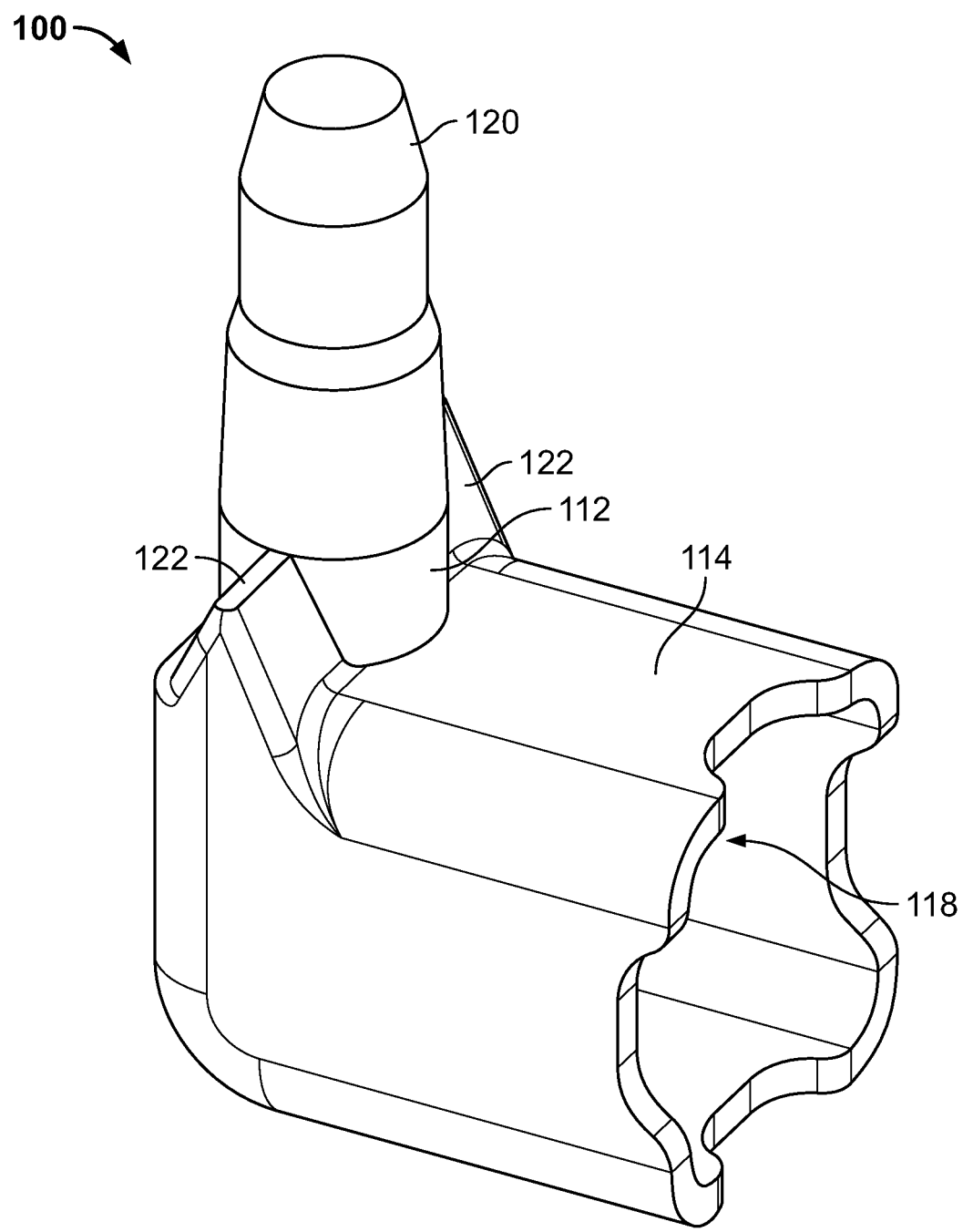
FIG. 2 is a perspective view an embodiment of the hitch receiver assembly in accordance with the instant disclosure.
Figure 3B:
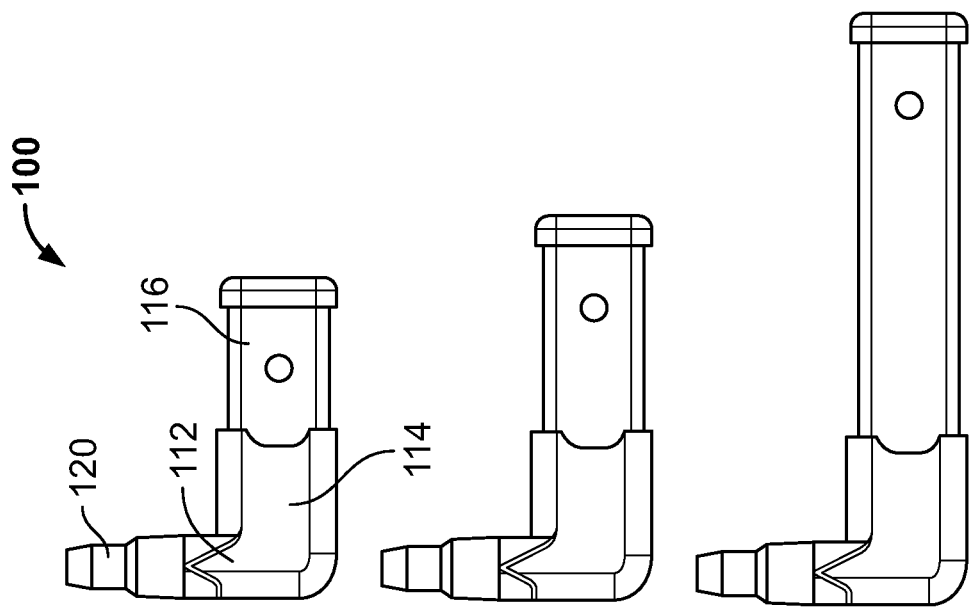
FIG. 3B is a side view the hitch receiver assembly attached to the various sized receiver members of FIG. 3A.
Figure 3A:
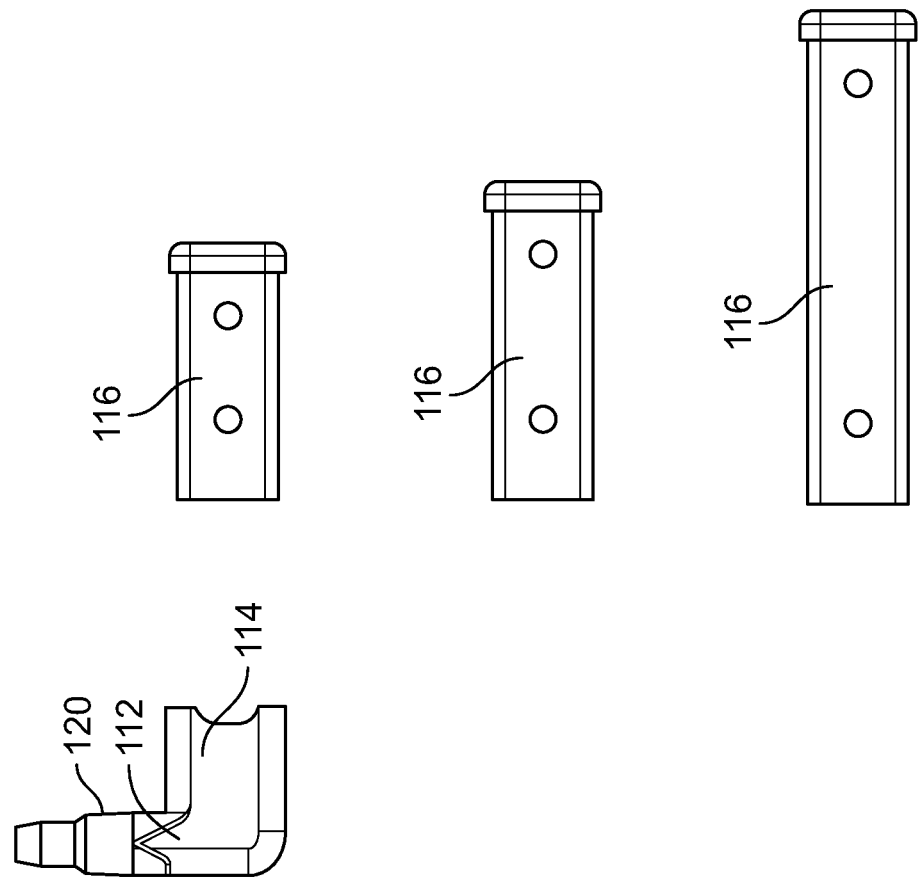
FIG. 3A are side views of embodiments of the hitch receiver assembly separate from various sized receiver members in accordance with the instant disclosure.

FIGS. 2, 3A, and 3B illustrate another embodiment of a hitch receiver assembly 100 in accordance with the instant disclosure. The hitch receiver assembly 100 includes a coupler body 112 having a female receiving portion 114 and an attachment portion 120. The coupler body 112 may be made of a metal or alloy. The receiving portion 114 may be selectively coupled to a receiving member 116 as illustrated by FIGS. 3A and 3B. Further the coupler body 112 may be a casted material that may be joinable to ASTM A500 steel tubing via welding to create a permanent joint with various lengths of receiver members 116. The attachment portion 120 and may be selectively coupled to a frame of a towing vehicle (not shown). The coupler body 112 may have a generally L-shaped configuration to allow the attachment portion 120 to be positioned generally perpendicularly related to the receiving portion 114.

The attachment portion 120 may be similar to attachment portion 20 as described above and have a generally tapered configuration to be able to slide into and attach with a receiver coupler 30. Similarly, the attachment portion 120 may include at least one locking member that may be toggled between a locked position and an unlocked position and be selectively attached to the receiver coupler 30. The receiver coupler 30 may be rigidly mounted to the frame of a towing vehicle (not shown).

The receiving portion 114 may be coupled to the receiving member 116. In one embodiment, the receiving member 116 is shaped as a tube wherein the receiving portion 114 is shaped to receive the receiving member 116 therein. The receiving portion 114 may define a cavity 118 for receiving the receiving member 116 therein. The cavity 118 of the receiving portion 114 may be generally complementary relative to the shape of the receiving member 116 wherein the receiving member 116 is snuggly inserted within the cavity 118. When attached the hitch assembly is attached to a towing vehicle, the receiving member 116 may extend passed the fascia of the towing vehicle to allow a hitch bar 40 to be inserted therein.

In various embodiments, the body 12, 112 has a cooperating square or rectangular tube shape that cooperates to form a male-female connection between the receiving portion 14, 114 and the receiving member 116. These shapes may conform to standardized dimensions to allow for the selective use of other towing components when the assembly 10, 100 is not installed.

The attachment portion 120 may extend upwardly from the body 112 and include structural supports 122 to allow the attachment portion 120 to maintain its structural orientation relative to the receiving portion 114. The structural supports 122 may be ridges that extend from the receiving portion 114 and may be formed along either side of the attachment portion 120.

The hitch bar 40 may be selectively inserted into the opposite side of the receiving member 116 as the receiving portion 114. The hitch bar 40 may be any configuration that is selectively coupled to a towed vehicle such as a ball mount, clevis, or other coupling arrangement. The hitch bar 40 may be attached to the receiving member 16 with a hitch pin that extends through apertures in the receiving member 116 and hitch bar 40.

As illustrated by FIGS. 3A and 3B, the receiver member 116 may be provided at various lengths in order to optimize placement of the aperture relative to the fascia of the vehicle. Further, the coupler body 112 may be formed to accommodate various sizes of receiver members 116 including sizes 1.25 inch and 2 inches that may be used between each applicable class ranges. FIGS. 3A and 3B illustrate the receiver member 116 being inserted and welded to the receiver portion 114 of the coupler body 112 to form a permanent assembly. The attachment portion 120 of the coupler body 112 may then be inserted into a receiver coupler 30 or sleeve that may be permanently or rigidly attached to the frame of the towing vehicle.

In operation, the inventive system allows for a connection with a vehicle having a downward facing connection point. This orientation provides the user with the option of detaching the receiver apparatus when it is not in use. Further, the receiver apparatus is still adaptable to standard-sized square or polygonal receiver Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, we claim:

1. A detachable receiver apparatus for a hitch assembly comprising:
   a hitch receiver tube;
   a body attached to the hitch receiver tube, the body having an attachment portion oriented at a substantially perpendicular angle relative to the hitch receiver tube;
   wherein the attachment portion selectively attaches to a connection point on a vehicle;
   a lock selectively locking the attachment portion with the connection point on the vehicle, wherein the lock is vertically positioned in the body;
   an actuator cooperating with the lock to toggle the lock between locked and unlocked positions; and
   a receiver coupler selectively attachable to the attachment portion between the body and the connection point.

2. The detachable receiver apparatus of claim 1 wherein the lock selectively locks the attachment portion to the receiver coupler.

3. The detachable receiver apparatus of claim 2 wherein the actuator is integrated with the receiver apparatus cooperating with the lock.

4. The detachable receiver apparatus of claim 1 wherein a shoulder is formed on the receiver coupler.

5. The detachable receiver apparatus of claim 4 wherein the actuator selectively locks attachment portion and the shoulder.

6. The detachable receiver apparatus of claim 5 further comprising a hitch ball mount selectively attachable to the hitch receiver tube at an end of said hitch receiver tube that is opposite to an end attached to the body.

7. The detachable receiver apparatus of claim 1 further comprising a hitch ball mount selectively attachable to the hitch receiver tube at an end of said hitch receiver tube that is opposite to an end attached to the body.

8. The detachable receiver apparatus of claim 7 wherein the hitch receiver tube has a substantially square shaped opening for selectively attaching the hitch ball mount.

9. The detachable receiver apparatus of claim 1 wherein the attachment portion includes a tapering terminal end.

10. The detachable receiver apparatus of claim 1 further comprising at least one support fin integrated between the attachment portion and the body.

11. A detachable receiver apparatus for a hitch assembly comprising:
    a body having an upright vehicle attachment end portion and a horizontal receiver attachment end portion, the vehicle attachment end portion and the receiver attachment end portions forming an L-shape;
    a receiver coupler connecting the vehicle attachment end portion to a connection point on a vehicle;
    a lock selectively locking the attachment end portion to the receiver coupler; and
    an actuator cooperating with the lock to toggle the lock between locked and unlocked positions, wherein the actuator comprises a turning dial.

12. The detachable receiver apparatus of claim 11 wherein the receiver coupler is a cylindrical body including an opening which receives a portion of the vehicle attachment end portion.

13. The detachable receiver apparatus of claim 12 wherein the opening faces downward.

14. The detachable receiver apparatus of claim 11 wherein the horizontal receiver attachment end portion includes a polygonal opening sized to couple to a towing accessory.

15. The detachable receiver apparatus of claim 14 wherein the polygonal opening is substantially square-shaped.

16. The detachable receiver apparatus of claim 11 wherein a terminal end point of the vehicle attachment end portion has a conical or tapering shape.

17. The detachable receiver apparatus of claim 16 wherein the terminal end point cooperates with a corresponding shape formed in the receiver coupler.

18. The detachable receiver apparatus of claim 11, wherein the dial engages a cylindrical threaded driver attached to a drive actuator.

19. The detachable receiver apparatus of claim 18, wherein the drive actuator is moveable to displace the lock to and from the locked and unlocked positions.

20. A detachable receiver apparatus for a hitch assembly comprising:
- a body having an upright vehicle attachment end portion and a horizontal receiver attachment end portion, the vehicle attachment end portion and the receiver attachment end portions forming an L-shape;
- a receiver coupler connecting the vehicle attachment end portion to a connection point on a vehicle;
- a lock selectively locking the attachment end portion to the receiver coupler; and
- an actuator cooperating with the lock to toggle the lock between locked and unlocked positions, wherein a terminal end point of the vehicle attachment end portion has a conical or tapering shape.

21. A detachable receiver apparatus for a hitch assembly comprising:
- a body having an upright vehicle attachment end portion and a horizontal receiver attachment end portion, the vehicle attachment end portion and the receiver attachment end portions forming an L-shape;
- a receiver coupler connecting the vehicle attachment end portion to a connection point on a vehicle;
- a lock selectively locking the attachment end portion to the receiver coupler, the lock comprising a drive actuator vertically displaceable between locked and unlocked positions; and
- an actuator toggling the drive actuator between the locked and unlocked positions.

\* \* \* \* \*